United States Patent [19]

Bizot et al.

[11] Patent Number: 4,608,480
[45] Date of Patent: Aug. 26, 1986

[54] PROCESS AND APPARATUS FOR LASER DRILLING

[75] Inventors: Henri Bizot, Paris; Géry-Charles J. Brasselet, Le Mee sur Seine; Jean-Paul Louis, Moissy Cramayel; Georges Narcy, Melun, all of France

[73] Assignee: S.N.E.C.M.A., Evry, France

[21] Appl. No.: 618,811

[22] Filed: Jun. 8, 1984

[30] Foreign Application Priority Data

Jun. 15, 1983 [FR] France .................. 83 09858

[51] Int. Cl.⁴ .................................. B23K 26/00
[52] U.S. Cl. ............ 219/121 LK; 219/121 LM; 219/121 LL; 219/121 LB; 219/121 LZ
[58] Field of Search ............... 219/121 LZ, 121 LM, 219/121 LD, 121 LG, 121 LN, 121 LJ, 121 LK, 121 EM, 121 LL, 121 LB

[56] References Cited

U.S. PATENT DOCUMENTS

| 3,700,850 | 10/1972 | Lumley et al. | 219/121 LB X |
| 3,800,829 | 4/1974 | Duston et al. | 219/121 LB X |
| 3,920,951 | 11/1975 | Chovan et al. | 219/121 LH |
| 4,001,840 | 1/1977 | Becker et al. | 219/121 LW X |
| 4,377,736 | 3/1983 | Daunt et al. | 219/121 LH |
| 4,507,536 | 3/1985 | Inoue | 219/121 LB |

FOREIGN PATENT DOCUMENTS

| 0013657 | 1/1980 | European Pat. Off. . | |
| 0064352 | 4/1982 | European Pat. Off. . | |
| 0066502 | 5/1982 | European Pat. Off. . | |
| 2511523 | 11/1982 | France . | |
| 0065400 | 5/1977 | Japan | 219/121 LR |
| 0074197 | 6/1977 | Japan | 219/121 LR |
| 0084287 | 6/1980 | Japan | 219/121 LZ |
| 0077689 | 6/1980 | Japan | 219/121 LZ |
| 0009783 | 1/1983 | Japan | 219/121 LZ |
| 0006785 | 1/1983 | Japan | 219/121 LZ |
| 2103834 | 6/1982 | United Kingdom . | |

OTHER PUBLICATIONS

Abstracts of Japan, volumes six and seven.

*Primary Examiner*—M. H. Paschall
*Attorney, Agent, or Firm*—Bacon & Thomas

[57] ABSTRACT

A process and apparatus are disclosed for accurately drilling and calibrating holes via a pulsed laser beam to form a perforated work piece. The sounds emitted by the melting of the work piece due to its contact with the laser beam are sensed, converted into digital form, compared with a reference value and are utilized to control the operating parameters of the laser.

15 Claims, 6 Drawing Figures

PROCESS AND APPARATUS FOR LASER DRILLING

BACKGROUND OF THE INVENTION

1. Field of the Invention

The present invention relates to a process and apparatus for forming relatively small diameter holes in relatively thin metallic plates by means of a pulsed laser beam.

2. Brief Description of the Prior Art

Processes and apparatus for drilling holes in thin sheet metal pieces or laminated plates by using high energy laser beam pulses are well known in the art. French Pat. No. 2,511,523 describes a process and apparatus for the verification and control of the position of the laser beam generator with respect to the work piece, but does not involve a system which forms each of the individual holes to a predetermined configuration. This patent involves the use of a light sensor to locate the laser beam with respect to the work piece but does not compensate for the variations in thickness of the work piece to ensure that the holes will have the desired configuration.

European Pat. No. 0013657 also descibes a method and apparatus for the use of a laser beam to drill holes in a work piece. In the system described therein, the radiation passing through the drilled hole is detected and utilized to control the laser beam generator. When a backing means is utilized with the work piece, the backer transmits impinged radiation from the hole to a detector coupled with the laser beam control so as to terminate the laser beam.

It is known that a pulse of a high energy beam, such as that delivered by a laser, may drill or form a hole in a relatively thin metallic work piece. For increasing thicknesses of the material and/or larger diameters of the holes to be drilled, it is, quite obviously, possible to increase the energy of the beam pulse (either by increasing the energy of the beam, increasing the duration of the pulse, or increasing both simultaneously) and to vary the focal distance of the laser beam. However, for reasons well known to those skilled in the art, the holes drilled in this manner exhibit irregularities when the thickness of the material to be drilled exceeds a certain threshold, except when the diameters of the holes are extremely small (for example on the order of 0.1 milimeter or less). Under these circumstances, the hole is the form of a more or less "crater" which normally renders it unsuitable for the intended application, which may be the production of elements with multiple perforations for sudation cooling, or for acoustic or antivibration panneling.

For this reason, it is generally preferable for relatively thick elements and/or holes with relatively large diamters (thicknesses on the order of 0.8 milimeters and diameters of several tenths) to form them with a succession of pulses. It is obviously necessary to control the succession of pulses directly or indirectly, as any drifting of one of the characteristics of the pulses may affect the quality of the finished hole. Certain deviations of the laser beam cause a reduction, or a change in distribution of the energy of the succession of pulses may result in a "blind" hole or one with a poorly defined opening. The same factors are true in cases where the thickness of the work piece varies in the area to be drilled, which occurs frequently when the work piece is a laminated element.

SUMMARY OF THE INVENTION

When a pulsed beam of energy is directed onto a work piece to form a hole therein, the concentration of the energy at the surface of the work piece liquifies and heats to the boiling or sublimation point the area contacted by the beam. This action generates radiation (which may be detected as set forth in European Pat. No. 0013657) visible light (which is detected in the system set forth in French Pat. No. 2,511,523) and audible sound. The instant invention utilizes the sound generated by the laser beam pulse contacting the work piece to control the drilling process. The characteristic sound is generated by the expulsion of vapor and slag by the highly concentrated energy beam. The characteristic sound varies according to the volume of material ejected and whether the pulse under consideration produces a blind hole, one with a slight opening, or one that has already been sized.

Although it would certainly be possible to ascertain the existance and/or the quality of the holes formed "by ear", or even to adjust the controls of the laser by listening to the emitted sound, such controls would be subjective and thus, not susceptible to accurate reproduction or correction.

One of the objects of the invention is to provide a control system for a laser beam which forms a multiplicity of openings in a thin work piece such that each hole opens effectively and in an acceptable fashion with the correct size on the surface of the work piece opposite to the laser beam pulse wherein the system is controlled by automatic means based upon the acoustic signals emmitted as the work piece is being drilled.

It is a further object of the invention to detect the drifting of the acoustic signal corresponding to a possible defect in the hole in the course of drilling and to correct one or more operating parameters of the laser (i.e., energy, duration, focal distance number or rate of pulses) in order to obtain holes that are formed with the proper dimensions. This correction may be affected either by visually observing an output display which indicates the quality of the hole being formed and manually correcting one or more of the laser parameters. Alternatively, the system may encompass an automatic control which varies the laser parameters automatically in response to an output signal such that the corrections will be accomplished in quasi-real time, i.e., the next hole will be corrected satisfactorily, or on a real time basis which corrects the hole currently being formed by the laser beam.

Although the invention may be utilized where the holes are formed by a single pulse, it is especially advantageous when the drilling and the calibration of the holes require at least two laser beam pulses. In these cases, the first pulse will serve to drill the hole, while the subsequent pulse or pulses calibrate the hole to its final size. The sound emitted during the first pulse is relatively strong, while less intensive sound is emanated during the sizing of the hole by the second or subsequent pulses. This appreciable reduction in sound emitted during the second or subsequent pulses makes it possible to verify that the hole has been formed properly.

For larger thicknesses of work pieces and/or for larger diameters of holes, several pulses (3 or 4 for example) are required to open the hole and to correctly size the hole. In the instance where four pulses are necessary, it is possible to detect the reduction in sound emanated during the third laser pulse and the even weaker sound generated by the fourth pulse which serves to size the hole.

The process according to the invention broadly encompasses the steps of acoustically sensing the sound generated by the melting of the work piece and converting this acoustic signal into a first electrical signal; passing the first electrical signal through an amplitude filter to filter out a portion of the signal below a predetermined threshold amplitude; converting this electrical signal into digital form; generating a second electrical signal corresponding to the laser beam pulses, converting this signal into digital form; placing the first and second electrical signals in phase with each other and generating a first input signal; generating a second input signal corresponding to the number of digital pulses above a threshold value necessary to properly form the hole; comparing the first input signal to the second input signal; and generating an output signal based upon this comparison which may be either visually displayed or utilized to control the operational parameters of the laser. The operational parameters which may be controlled include the energy of the beam, the duration of the pulse, the focal distance of the beam, and the number of pulses or their rate. The characteristic of the acoustic signal which is utilized to generate the electrical control signal may be the sound intensity or the sound level.

The process may also include the generation of a supplementary pulse of the laser beam in addition to the regular programmed pulses in order to correct any defects which may exist in the sizing of the hole.

The apparatus for carrying out this process broadly comprises an acoustic sensing means to sense the sound generated by the melting of the work piece and to generate a first electrical signal; amplitude filter means to filter out a portion of this electrical signal below a predetermined threshold; first analog-digital digital conversion means to convert the signal into digital form; a laser pulse detector to generate a second electrical signal in response to each pulse of the laser beam; second analog-digital conversion means to convert this second signal into digital form; recorder means to place the first and second electrical signals in phase with each other and to generate a first input signal; reference value generating means to generate a second input signal corresponding to the number of digital pulses above a threshold value necessary to properly form the hole; comparison means to compare the first and second input signals and to generate an output signal based on this comparison, which may be utilized to actuate a visual display or to automatically control the operational parameters of the laser.

DETAILED DESCRIPTION OF THE PREFERRED EMBODIMENTS

Figure 1:
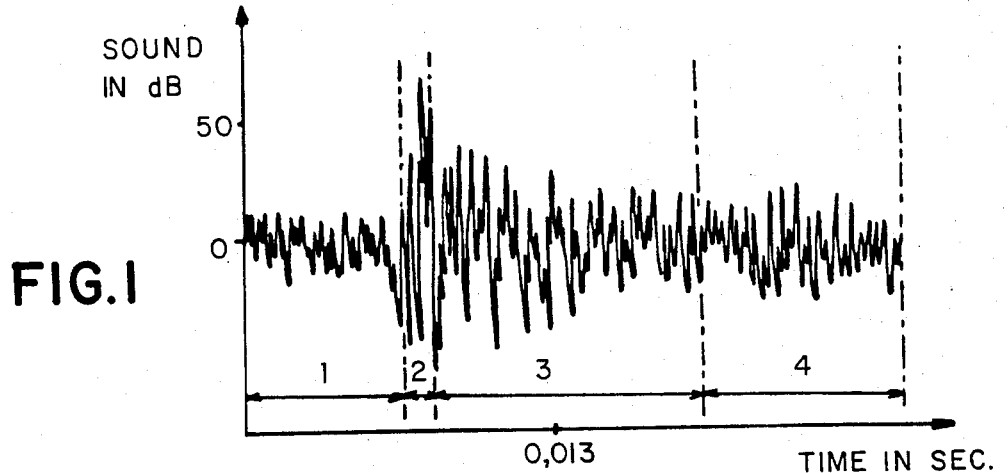
FIG. 1 is a graph showing the acoustic signal of the sound generated by the melting of the work piece due to contact with the laser beam.

FIG. 1 shows a graph of the sound emitted during the impact of the laser beam on the work piece with the sound level in decibels plotted as the ordinate and the time in seconds as the abscissa. The portion of the sound graph designated by 1 corresponds to the background noise prior to the laser pulse. The portion 2 of the sound graph corresponds to the laser pulse, while portion 3 corresponds to the sound following the laser pulse. Portion 4 corresponds to the return to the background noise.

Figure 2A:
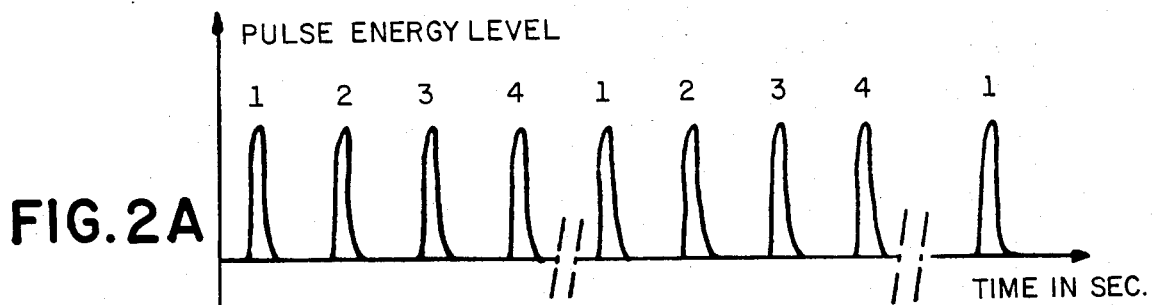
FIGS. 2A-2C are graphs of the laser pulses, the acoustic signals, and the digital form of signal for a first hole (left portion of each figure), a second hole (center portion of each figure) and the nth hole (right portion of each figure) plotted as amplitude versus time.
Figure 2B:
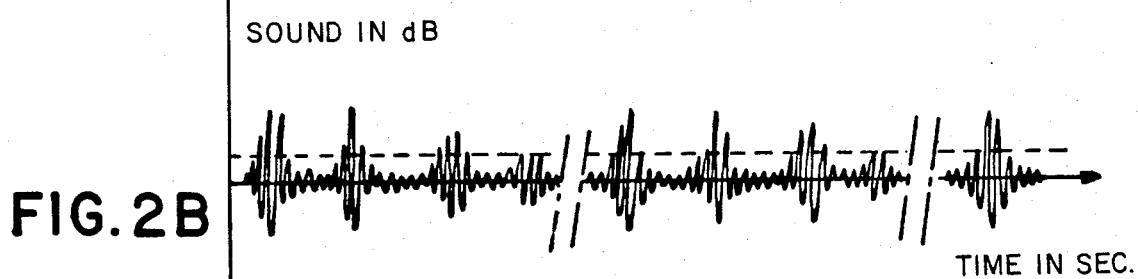
Figure 2C:
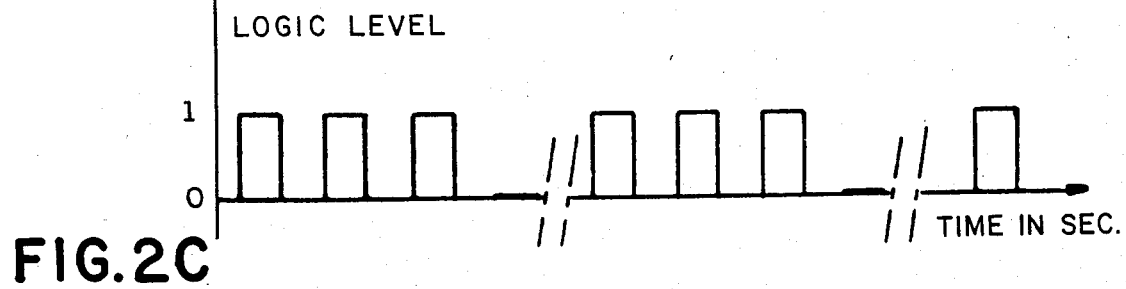

FIG. 2 shows three graphs, each as a function of time wherein FIG. 2A shows the laser beam pulses with energy of the pulses plotted as the ordinate. For this particular graph, and those shown in FIGS. 2B and 2C, it will be assumed that four pulses are necessary to drill and size the hole. Quite obviously, the invention may be utilized with either a greater or lesser number of pulses, depending upon the individual characteristics of the work piece being drilled. As indicated previously, the left portion of the graph indicates the four pulses necessary to form the first hole, the center portion indicates the four pulses necessary to form the second hole, while the right portion of the graph indicates the first pulse for forming the nth hole. FIG. 2B represents the acoustic signal generated by the pulses shown in FIG. 2A. As noted in this graph and as described in more detail hereinafter, the maximum amplitude of the sound decreases for the latter pulses, since the hole, at that point, has been formed and is merely being properly sized by these latter pulses. A threshold value of the sound level is shown by the dashed line parallel to the abscissa. It should be noted that the final or sizing pulse is somewhat less than this threshold value, while the remaining pulses exceed this value.

FIG. 2C shows the digital output after the acoustic signal has been converted to digital form. The output is either a "0" or a "1", with the amplitude exceeding the threshold value being assigned the "1" and lesser amplitude values being assigned "0". Thus, since the sound emitted by the first three pulses exceed this threshold value, the logic output assigns them the "1" value. The sound emitted by the fourth pulse, however, falls below the threshold value and is assigned the "0" value.

From FIG. 2A it can be seen that all of the laser pulses have exactly the same energy levels and have a duration of approximately one milisecond with a frequency of several tens of HERTZ. As shown in FIG. 2B, the acoustical signal emitted by each pulse or each series of pulses for each hole has approximately the same amplitude for the first two pulses, a slightly lesser value for the third pulse and a much smaller value for the fourth pulse.

For each series of pulses shown, the first two pulses progressively form the hole, the third pulse opens the hole through the work piece and the fourth completes the sizing and calibration of the hole.

However, there may be factors present which result in incorrect sizing of the hole or, in the extreme case, the formation of a blind hole. This could occur if there is a drifting of the operational characteristics of the laser pulses or if there is a variation in the thickness of the work piece. This latter is often encountered when drilling sheet metal work pieces (especially if they are laminated) since the thickness is often irregular due to the standard manufacturing tolerances. The tolerance of the thickness of a steel or super alloy sheet of material is on the order of ten percent.

As will be appreciated by those skilled in the art, when such an anomaly is encountered, the acoustic signal and the logic level of the sound will differ from those shown in FIG. 2. In these cases, if the drilling has not been completed or if the calibration is not of the desired quality, the fourth pulse in the example shown in FIG. 2 will generate a stronger sound than the normal case. In such a case, the amplitude of the sound generated by the fourth pulse is above the threshold level, and therefore, is assigned the value "1" rather than "0" as indicated in FIG. 2C. This gives a clear indication that the hole has either not been formed or has been improperly formed.

Figure 3:
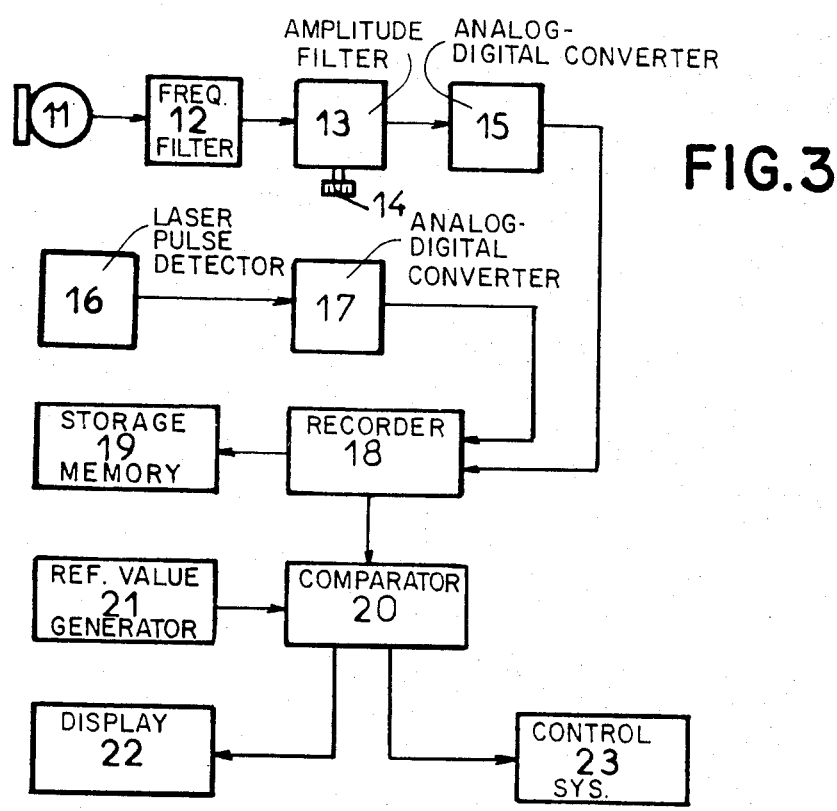
FIG. 3 is a schematic diagram of the elements according to the invention.

FIG. 3 shows a schematic diagram of the apparatus for carrying out the process according to the invention. Microphone 11 is positioned adjacent to the work piece so as to pick up the sounds generated by the impingement of the laser beam thereon. The electrical signal generated by the microphone passes through a frequency filter 12 to eliminate or reduce the background noise of the work area. It has been found that the noise emitted by the work piece at each pulse is primarily limited to a frequency band (for a super alloy material having a thickness of 2 milimeters) between 2,000–3,000 HERTZ. A frequency filter which passes sound only between these two limits will, therefore, eliminate all of the work area noise and provide a higher precision for the apparatus. It should be noted, however, that this frequency filter is required only when the apparatus is utilized under working conditions with relatively high background noise levels.

This first electrical signal is further passed through amplitude or noise level filter 13 whose threshold value may be controlled or adjusted by adjustment means 14. This filter passes only those signals exceeding this threshold which defines the sound level under which a hole is improperly drilled or calibrated. The output signal of amplitude filter 13 corresponds to a succession of sounds related to the drilling or sizing pulses and to "mute" zones corresponding to properly drilled and calibrated holes. The threhold value of amplitude filter 13, corresponding to the dashed line in FIG. 2B is set just above the sound level corresponding to the fourth or final pulse.

The output signal from amplitude filter 13 passes into analog-ditial converter 15 which converts this signal to the digital form shown in FIG. 2C.

In a similar manner, laser pulse detector 16 generates a second electrical signal corresponding to each pulse of the laser beam. This second electrical signal is also converted into digital form by second analog-digital converter 17. This digital form signal along with the output of analog-ditial converter 15 passes into recorder 18 which places the signals in phase. From the recorder 18, information may be sent to temporary storage memory 19 for a period of time in which the hole is effectively drilled and calibrated. Recorder 18 also generates a first input signal which is connected to comparator 20. Comparator 20 affects a comparison between this first input signal and a second input signal from reference value generator 21 which corresponds to the theoretical number of pulses necessary to properly drill and calibrate the hole. Comparator 20 examines the logic level of the sound emitted during the impact of the fourth or last pulse programmed for a complete and calibrated hole. If this level is "0", i.e., the amplitude of the noise for the last pulse is less than the threshold value, it signifies that the hole is properly drilled and calibrated. If, however, the logic level of this last pulse is equal to "1", it signifies that the hole is not properly formed or is improperly dimensioned. In a simplified form of the invention, this indication from comparator 20 may be visually displayed by display 22 to indicate to the laser operator the defected quality of the hole. This will enable the operator to manually adjust the operating parameters of the laser in order to correct the deficiency. Among the operating parameters which may be modified to adjust the hole formation are the instantaneous energy of the laser beam pulse; the duration of the pulse; the position of the focal point of the laser beam; the number of pulses; and the rate of the pulses.

The output signal of comparator 20 may also be utilized to affect an automatic correction of the laser beam to correct any deficiencies which may exist in the holes. This accomplished by control mechanism 23 which may be connected to laser control device 50 via known means. The control signal from comparator 20 may be used to alter the operating parameters of the laser beam to properly form the next hole in the series, a "quasi-real" time automatic control. The variations of the work piece thicknesses occurs gradually, as does any drift of the operating parameters of the laser beam. This makes the "quasi-real" time correction entirely acceptable for the next hole in the series. The control may vary the pulse energy, the pulse duration, the position of the focal point and the number of the pulses, although generally speaking, the varying of the position of the focal point of the beam provides the most advantageous solution.

In the "quasi-real" time automatic control, the acoustic signal of the last programmed pulse is considered in correcting the operating parameters for the next hole to be formed. By utilizing as a control signal the output of comparator 20 it is, as a practical matter, virtually impossible to utilize this information to modify the characteristics of the present or the preceding pulses which affect the quality of the drilling and sizing of the hole presently being formed. In practice, this system permits only the correction of the drilling or calibration of the next hole which, in view of the small variations in the thickness or the operating paramters results in a perforated work piece of acceptable quality.

It is possible to control the laser beam parameters in real time in order to correct the hole presently being drilled. In this case, the signal emanating from the amplitude filter 13 is used as the control signal by comparing its level with a reference level for the first, second, etc., pulse. In this case, the deviation from this reference level of a sound emitted by each pulse will permit the operating parameters of the laser beam to be adjusted during the drilling of the hole. In this embodiment, the number of pulses may be varied by utilizing supplemental pulses to properly form or size the hole.

Figure 4:
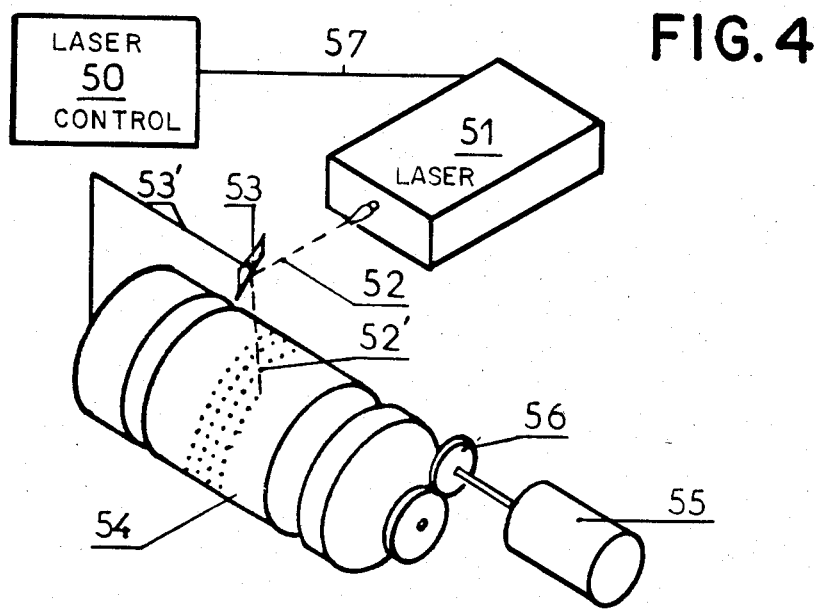
FIG. 4 is a perspective schematic showing the laser and its association with the work piece.

In certain cases, the number of holes to be drilled in successive rows is considerable and it is necessary to employ a system for the automatic displacement of the work piece which is synchronized with the laser pulses. Such a system is schematically shown in FIG. 4. Laser control system 50 is connected to laser 51 such that the operational parameters of the laser 51 may be automatically controlled. As indicated previously, laser control 50 may be connected to control mechanism 23 via any known means. Laser 51 may be of the pulsed beam type or the continuous beam type, in which case the beam is chopped into pulses by means well known to those skilled in the art. Laser 51 focuses the pulses onto the surface of the work piece by redirecting the path 52 of the beam into path 52' by reflecting mirror 53. The operation of mirror 53 is synchronized via link 53' with the rotational movement of the work piece 54. In the particular illustration, work piece 54 is an element of revolution (such as a combustion chamber) which is supported at either end by rotatable support means such that the work piece 54 may be rotated about its axis of revolution. Motor 55 engages the rotatable work piece through gears 56 to affect the rotation of work piece 54.

Mirror 53 is controlled such that the beam 52 for the last or controlled pulse perpendicular to the work piece. For each preceding pulse, the synchronization of the mirror 53 and the work piece 54 is affected such that the impact of the successive pulses will be at the same point as that of the last but one pulse. It should be understood that the mirror rotates in keeping with the appropriate position for the first pulse of the series corresponding to the hole formation and returns to its initial position for the formation of the next hole.

As is known to those skilled in the art, this system theoretically produces defects comparable to parallax errors, but in view of the rapid pulse rate (20 to 50 pulses a second) and the relatively low velocity of the displacement of the work piece, these defects are negligible. Link 57 interconnects laser control 50 with laser 51 in a known manner to affect the operation of the laser parameters.

The foregoing description is provided for illustrative purposes only and should not be construed as in any way limiting the scope of this invention which is solely defined by the appended claims.

What we claim is:

1. A process for laser drilling a plurality of holes completely through a work piece comprising the steps of:
    (a) directing a pulsed laser beam onto the work piece so as to form a hole extending completely through the work piece;
    (b) placing an acoustic sensing means in proximity to, but not in contact with the work piece;
    (c) acoustically sensing the audible sound generated by the melting of the work piece caused by the laser beam pulse and converting the acoustic signal into a first electrical signal proportional to the audible sound;
    (d) passing the first electrical signal through a frequency filter to filter out those frequencies below a predetermined value;
    (e) passing the first electrical signal through an amplitude filter;
    (f) adjusting a threshold value of the amplitude filter such that, when the hole extends completely through the work piece and is properly sized, the amplitude of the first electrical signal is below the threshold value;
    (g) converting the first electrical signal into digital form by assigning a value of 1 to each laser pulse electrical signal above the threshold amplitude and a value of 0 to those below the threshold amplitude;
    (h) generating a second electrical signal for each pulse of the laser beam;
    (i) converting the second electrical signal into digital form;
    (j) placing the first and second electrical signals in phase with each other and generating a first input signal;
    (k) generating a second input signal corresponding to the number of digital pulses above the threshold amplitude necessary to properly form the hole completely through the work piece;
    (l) comparing the first input signal to the second input signal;
    (m) generating an output signal based upon the comparison of the first and second input signals;
    (n) displaying the output signal so as to indicate the quality of the hole being formed; and,
    (o) controlling one of the operating parameters of the laser with the output signal.

2. The process according to claim 1 wherein the output signal controls the energy level of the laser beam.

3. The process according to claim 1 wherein the output signal controls the duration of the laser beam pulse.

4. The process according to claim 1 wherein the output signal controls the focal point of the laser beam.

5. The process according to claim 1 wherein the output signal controls the number of pulses of the laser beam.

6. The process according to claim 1 wherein the output signal controls the rate of laser beam pulses.

7. The process according to claim 1 wherein a plurality of holes are formed in the work piece and wherein the output signal controls the operating parameters of the laser beam to correct any deficiencies in the hole being formed before the next hole is formed.

8. The process according to claim 5 comprising the additional step of generating at least one supplemental pulse of the laser beam to correct any deficiencies in the hole being formed.

9. The process according to claim 1 further comprising temporarily storing the output signal in a storage memory.

10. Apparatus for drilling a plurality of holes completely through a work piece comprising:
    (a) means directing a pulsed laser beam onto the work piece so as to form a hole extending completely through the work piece;
    (b) acoustic sensing means located in proximity to, but not in physical contact with, the work piece to sense the audible sound generated by the melting of the work piece caused by the laser beam pulses and to generate a first electrical signal proportional to the audible sound;
    (c) amplitude filter means connected with the acoustic sensing means to filter out a portion of the first electrical signal below a predetermined threshold amplitude;
    (d) means to adjust the threshold amplitude of the amplitude filter means such that, when the hole extends completely through the work piece and is properly sized, the amplitude of the first electrical signal is below the threshold amplitude;
    (e) first analog-digital conversion means connected to the amplitude filter means to convert the first electrical signal into digital form assigning a value of 1 to each laser pulse electrical signal above the threshold amplitude and a value of 0 to those below the threshold amplitude;
    (f) frequency filter means connected between the acoustic sensing means and the amplitude filter means to filter out those frequencies below a predetermined value;

(g) a laser pulse detector to generate a second electrical signal in response to each pulse of the laser beam;

(h) second analog-digital conversion means connected to the laser pulse detector to convert the second electrical signal into digital form;

(i) recorder means connected to the first and second analog-digital conversion means to place the first and second electrical signals in phase with each other and to generate a first input signal;

(j) reference value generating means to generate a second input signal corresponding to the number of digital pulses above the threshold amplitude necessary to properly form the hole completely through the work piece;

(k) comparison means connected so as to receive the first and second input signals and to generate an output signal based on the comparison;

(l) display means connected to the comparison means to display the output signal so as to indicate the quality of the hole being formed; and, (m) control means connected so as to receive the output signal and to control at least one of the operating parameters of the laser.

11. The apparatus of claim 10 wherein the control means is connected to the laser so as to control the energy level of the laser beam.

12. The apparatus of claim 10 wherein the control means is connected to the laser so as to control the duration of the laser beam pulse.

13. The apparatus of claim 10 wherein the control means is connected to the laser so as to control the focal point of the laser beam.

14. The apparatus of claim 10 wherein the control means is connected to the laser so as to control the number of pulses of the laser beam.

15. The apparatus of claim 10 wherein the control means is connected to the laser so as to control the pulse rate of the laser beam.

* * * * *